US005361049A

United States Patent [19]

Rubin et al.

[11] Patent Number: 5,361,049

[45] Date of Patent: Nov. 1, 1994

[54] TRANSITION FROM DOUBLE-RIDGE WAVEGUIDE TO SUSPENDED SUBSTRATE

[75] Inventors: David Rubin; Kurt Reinke, both of San Diego, Calif.

[73] Assignee: The United States of America as represented by the Secretary of the Navy, Washington, D.C.

[21] Appl. No.: 855,209

[22] Filed: Apr. 14, 1986

[51] Int. Cl.[5] .............................................. A01P 5/107

[52] U.S. Cl. .......................................... 333/26; 333/34

[58] Field of Search .......................... 333/21 R, 26, 34

[56] References Cited

U.S. PATENT DOCUMENTS

| | | | |
|---|---|---|---|
| 2,933,705 | 4/1960 | Hopfer | 333/34 X |
| 3,579,149 | 5/1971 | Ramsey . | |
| 3,737,812 | 6/1973 | Gaudio et al. | 333/26 X |
| 3,924,204 | 12/1975 | Fache et al. . | |
| 4,052,683 | 10/1977 | van Heuven et al. . | |
| 4,123,730 | 10/1978 | Fikart . | |
| 4,144,506 | 3/1979 | McCammon et al. | 333/26 |
| 4,453,142 | 6/1984 | Murphy | 333/26 |
| 4,458,222 | 7/1984 | Herstein et al. . | |

FOREIGN PATENT DOCUMENTS

| | | | |
|---|---|---|---|
| 2552586 | 3/1985 | France | 333/26 |
| 87202 | 5/1982 | Japan | 333/26 |

OTHER PUBLICATIONS

Moreno, *Microwave Transmission Design Data,* Dover Publ., N.Y., 1948, Title page & pp. 51–53 relied on.

*Suspended Substrate Airstrip Cuts Microwave System Losses,* Design Eng. (GB), Oct. 1976, p. 13.

*Primary Examiner*—Paul Gensler

*Attorney, Agent, or Firm*—Harvey Fendelman; Thomas Glenn Keough

[57] ABSTRACT

A metallic housing encloses a suspended substrate circuit and is arranged so that the waveguide input/output port within the housing has double-ridge transitions to the suspended substrate circuit.

10 Claims, 4 Drawing Sheets

TRANSITION FROM DOUBLE-RIDGE WAVEGUIDE TO SUSPENDED SUBSTRATE

STATEMENT OF GOVERNMENT INTEREST

The invention described herein may be manufactured and used by or for the Government of the United States of America for governmental purposes without the payment of any royalties thereon or therefor.

BACKGROUND

The present invention relates generally to the field of waveguides and waveguide devices and, more particularly, to transitions from waveguide media to suspended substrate circuits. Still more specifically, the present invention relates to transitions from double-ridge waveguide to suspended substrate millimeter wave circuits.

Prior to this invention, transitions to suspended substrate were available over bandwidths corresponding to the lowest order waveguide mode or over bandwidths limited by higher order modes in coaxial transitions. With respect to waveguides, for example, transitions could be fabricated to cover 18–26.5 GHz and other transitions could be fabricated to cover the 26.5–40 GHz band. No transitions, however, could be built to cover, for example, the 20–40 GHz band.

Coaxial transitions covering up to 40 GHz have recently become available for use with microstrip circuits. They are, however, fragile and the circuits must be soldered to the center tabs of the coaxial connector. Further, these types of coaxial transitions have reached their limit in frequency scalability. Difficulties have been encountered with their use with millimeter wave suspended substrate circuits. Also, their small dimensions will limit their use at high power levels.

SUMMARY OF THE INVENTION

The present invention overcomes the foregoing problems by providing a transition to suspended substrate circuits and, more particularly, to suspended substrate millimeter wave circuits from double-ridge waveguide over octave bandwidths. The transition disclosed herein permits operation over frequencies in the 20–40 GHz range which is a one-octave frequency range. The transition is scalable and herefore should cover very large bandwidths at higher frequency ranges. Moreover, the transition disclosed requires no soldering and is extremely sturdy. Further, unlike subminiature coaxial transitions, the transition of the present invention is formed as part of the circuit housing and is thereby extremely rugged.

These advantages are accomplished by fabricating a metallic housing for enclosing the suspended substrate circuit board. The metallic housing has a channel formed within it such that the suspended substrate circuit board is positioned within the channel and such that the suspended substrate circuit is suspended in air. Further, the metallic housing includes at least one double-ridge waveguide that serves as an input/output port and that is aligned with respect to the suspended substrate circuit board such that a portion of the substrate circuit lies within the region encompassed by the waveguide input/output port. The double-ridge waveguide input/output port is comprised of a first set of stepped ridges extending from one broadwall of the waveguide input/output port and a second set of stepped ridges extending from the second broadwall of the waveguide input/output port. The first set of stepped ridges are formed by a single ridge which extends from the first broadwall of the waveguide input/output port and is further comprised of a plurality of ridge height adjustment screws which protrude through the metallic housing and through the single ridge so as to extend into the region encompassed by the waveguide input/output port. These ridge height adjustment screws enable fine tuning of the device.

OBJECTS OF THE INVENTION

Accordingly, it is the primary object of the present invention to disclose a transition from waveguide to suspended substrate circuits that covers over an octave bandwidth.

It is a further object of the present invention to disclose a waveguide to suspended substrate transition that is suitable for operation over the frequency range from 20–40 GHz.

It is a still further object of the present invention to disclose such a transition that requires no solder connections.

It is a concomitant object of the present invention to disclose a waveguide to suspended substrate transition that is formed as part of the suspended substrate circuit housing and is extremely rugged.

It is yet another object of the present invention to disclose a waveguide to suspended substrate transition that is easily scalable to higher frequencies.

Other objects, advantages and novel features of the invention will become apparent from the following detailed description of the invention when considered in conjunction with the accompanying drawings.

DESCRIPTION OF THE PREFERRED EMBODIMENT

Figure 1:
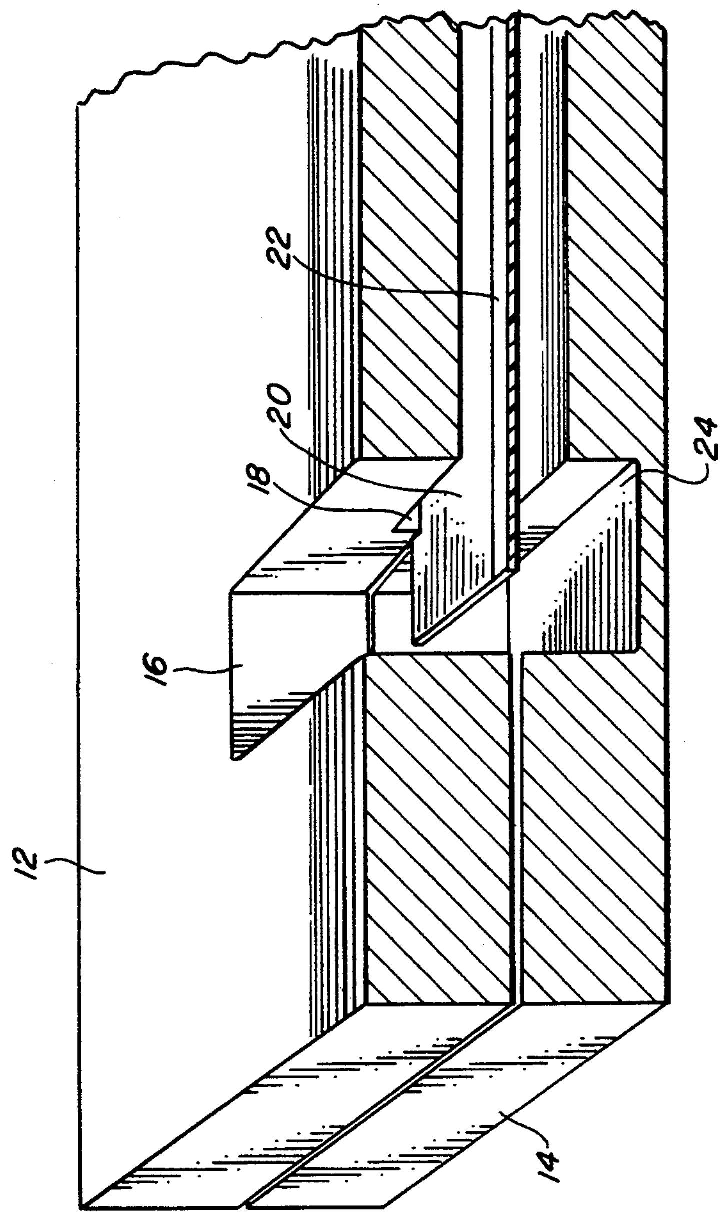
FIG. 1 (Prior Art)
FIG. 1 is an isometric cross-section of a prior art transition from rectangular waveguide to suspended substrate.

Referring first to FIG. 1 a prior art transition from rectangular waveguide to suspended substrate will be described in order to facilitate an understanding of the improvements and modifications of the present invention. Most suspended substrate housings consist of two metallic blocks within which channels have been formed so that the suspended substrate circuit board is suspended in air but surrounded by metal. The dimensions of the channels are made small enough to prohibit waveguide propagation, i.e. the dimensions are such that the suspended substrate circuit operates in a quasi-TEM mode. By way of example, a prior art suspended substrate housing is illustrated in FIG. 1 and includes metallic housing upper portion 12 and metallic housing lower portion 14. The portions of the sections 12 and 14 not shown (i.e. the right half) are the mirror image of the portions that are shown. The metallic housing sections 12 and 14 fit together as illustrated in FIG. 1 and are machined such that when they fit together they form a rectangular waveguide input/output port 16. They are also machined such that channel 18 is formed within them to accommodate the suspended substrate circuit board 20. The suspended substrate circuit board 20 is typically comprised of a sheet of dielectric material upon which a suspended substrate line 22, preferably comprised of copper, is affixed. Elements such as diodes, transistors, or ferrites may also form part of the circuit. The suspended substrate line 22 is illustrated in FIG. 1 as a suspended substrate line and probe. The suspended substrate circuit board 20 thus is positioned within the channel 18 such that the line and probe 22 are suspended in air but surrounded by the metallic housing comprised of 12 and 14. A back-short cavity 24 is also formed within the housing component 14 and merges with the waveguide cavity 16 as is illustrated so as to form a single rectangular volume. As is further illustrated in FIG. 1, the suspended substrate circuit board 20 and a portion of the suspended substrate line and probe 22 extend into the region encompassed by the waveguide input/output port 16 such that energy can propagate from the waveguide input/output port 16 to the suspended substrate line and probe 22 and vice versa.

Figure 2:
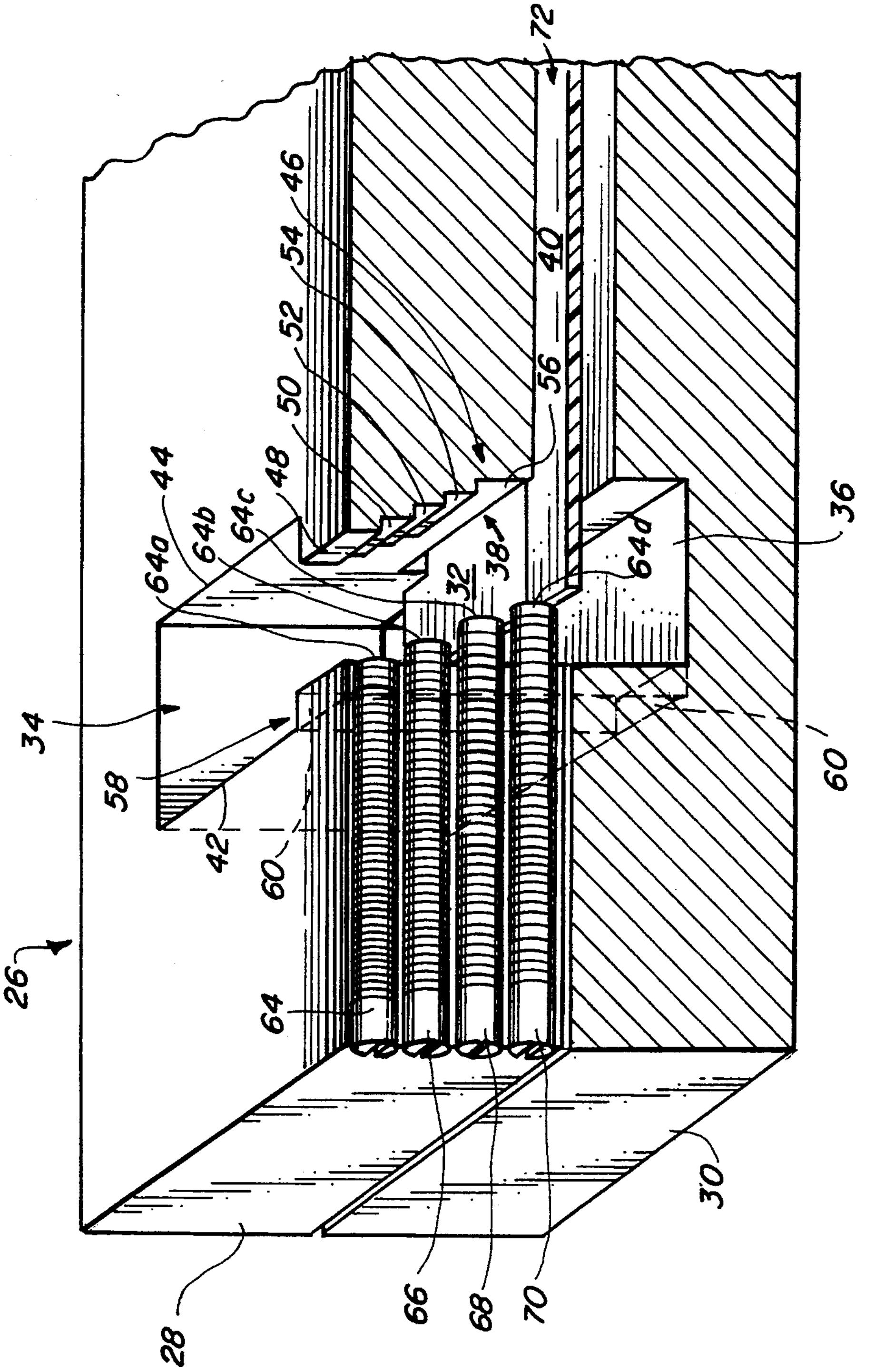
FIG. 2 is an isometric partial cross-section of the transition from double ridge waveguide to suspended substrate in accordance with the present invention taken along lines II—II of FIG. 3 and showing the left half of the device shown in FIG. 3.
Figure 3:
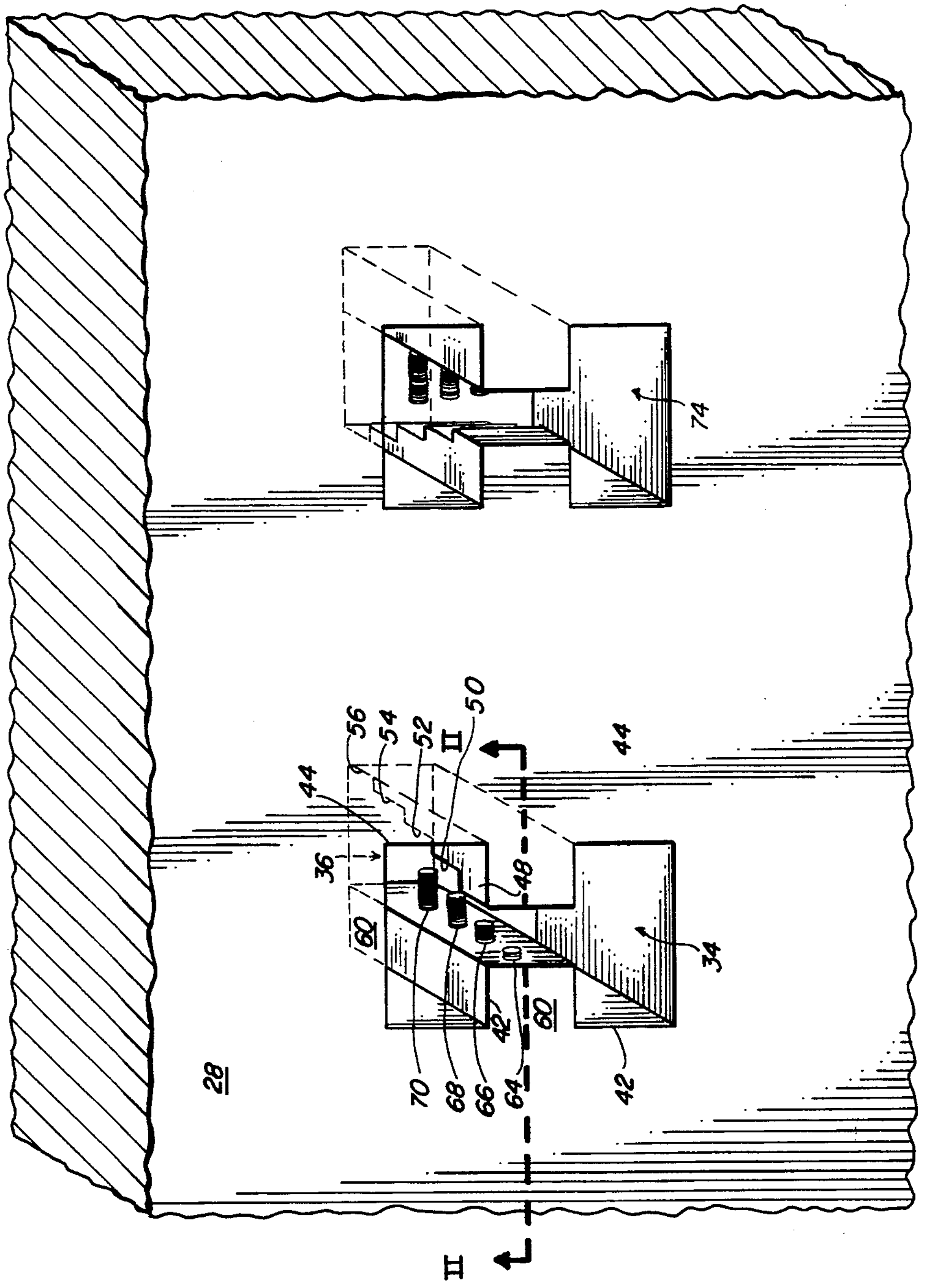
FIG. 3 is an isometric top view of a portion of the top portion of the metallic housing of the present invention showing dual input/output ports, with the suspended substrate circuit board removed.
Figure 4:
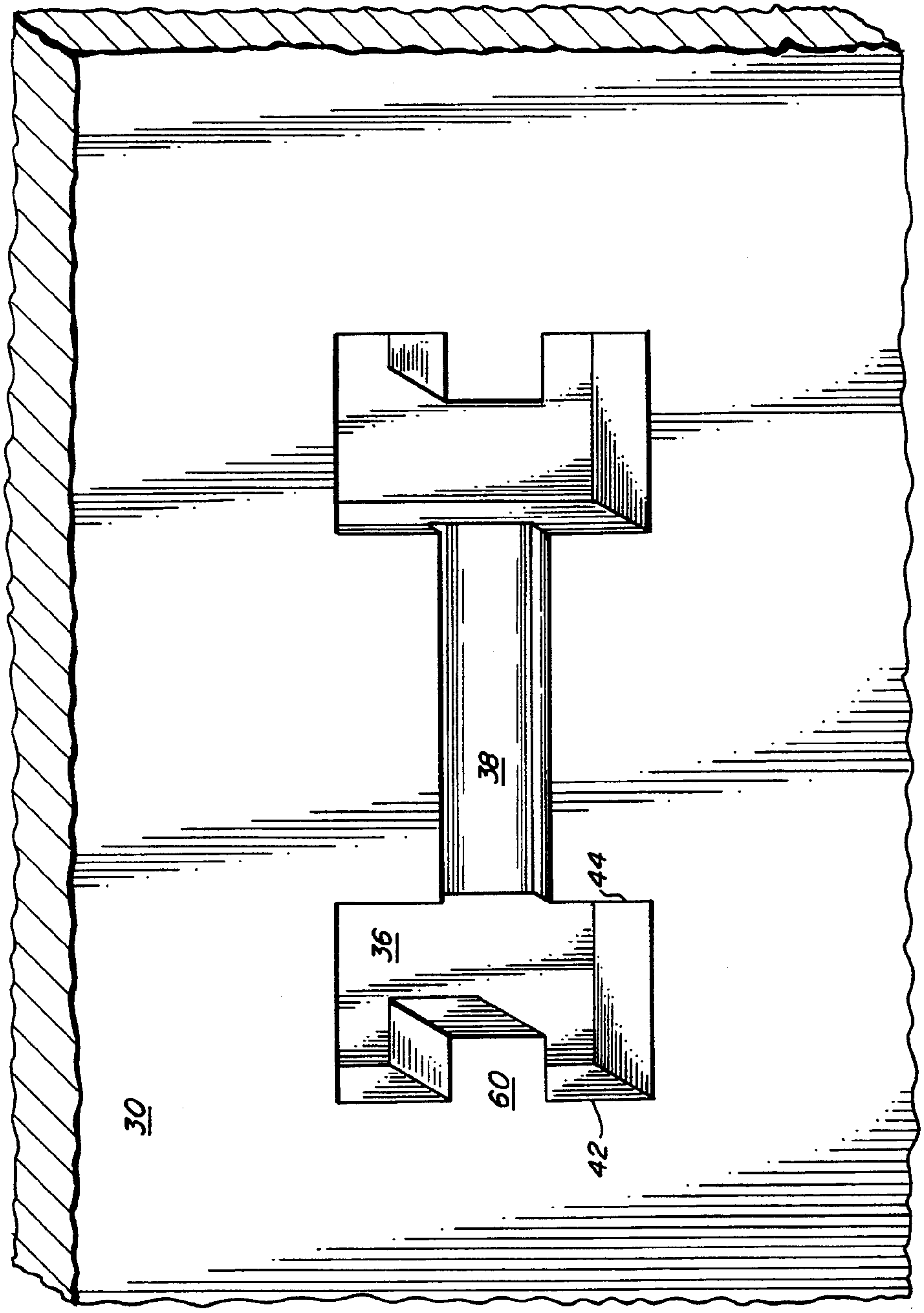
FIG. 4 is an isometric view of a portion of the bottom half of the metallic housing of the present invention showing the suspended substrate channel and backshort cavities with the substrate circuit board removed.

Referring now to FIGS. 2, 3 and 4 the transition of the present invention will be described. The transition of the present invention is comprised of a metallic housing 26 which is most easily manufactured with a split block assembly comprising metallic housing top half 28 and metallic housing bottom half 30. The top half 28 and bottom half 30 fit together as illustrated in FIG. 2 so as to form a complete metallic enclosure around the suspended substrate circuit board 32. Each half 28 and 30 of the assembly 26 is machined such that a waveguide input/output port 34 is formed within the metallic housing assembly 26. Further, the housing bottom portion 30 is also formed so as to create s back short cavity 36 similar to the back short cavity 24 shown and illustrated with respect to FIG. 1. Also, channel 38 is formed within the top portion 28 and bottom portion 30 such that the suspended substrate circuit board 32 is suspended in air but surrounded by metal as is well known. By way of example, the suspended substrate circuit board 32 has a metallic, usually copper, line and probe 40 fixed on the surface of circuit board 32. Elements such as diodes, transistors, and ferrites (not shown) may also be used on the board 32 as is well known. As an be seen in comparison with FIG. 1, the transition of the present invention illustrated in FIG. 2 as thus far described is identical to the prior art structure illustrated in FIG. 1. It should be understood that the substrate line and probe 40 would normally connect to a substrate circuit such as a millimeter wave filter.

In accordance with the present invention, the bandwidth of the transition is substantially increased by the incorporation of a double-ridge protruding, respectively from the broadwalls 42 and 44 of the waveguide input/output port 34. The ridge 46 that is closest to the suspended substrate probe line 40 is tapered or stepped downward by means of steps 48, 50, 52, 54 and 56 until the ridge 46 is gone, i.e. in the same plane as the plane of the broadwall 44. The opposite ridge 58 is made from a single ridge 60 protruding from broadwall 42 and containing tuning screws 64, 66, 68 and 70. The tuning screws 64, 66, 68 and 70 extend from the exterior of the metallic housing 26, through the metallic housing, through the single ridge 60 and into the cavity 34 as is illustrated. The tuning screws may be adjusted such that the ends 64*a*, 64*b*, 64*c* and 64*d* protrude into the waveguide cavity 34 as adjustable stepped ridges. As can be seen in FIG. 2, the tuning screws do not protrude into the back short cavity 36. However, the single ridge 60 does continue into the back short cavity to the bottom thereof. It can thus be seen in FIG. 2 that the transition from the waveguide port 34 to the suspended substrate probe line 40 evolves from a double ridge waveguide section in the region that is in the vicinity of opposing ridges 48 and 60 to a single ridge waveguide section in the region that is in the vicinity of ridge/tuning screw 70 after which the transition of the present invention evolves into the suspended substrate media.

Referring to FIG. 3, top portion 28 of the metallic housing 26 is illustrated as having dual-ridge waveguide input/output port 34 and a second dual-ridge waveguide input/output port 74, it being understood that port 74 is the mirror image of port 34. It should also be understood that, while the ports 34 and 74 are both illustrated as passageways in the top half 28 of the assembly 26, the port 34 could be located in the top half 28 and the port 74 could be located in the bottom half 30 provided that its orientation is rotated 180° as would be obvious.

In order to adjust the transition for best performance, the circuit line 72 extending from the line and probe 40 is tapered and a tapered ferrite load (not shown) is placed above or below the line, up to the cavity height. The tuning screws 64, 66, 68 and 70 are then adjusted by maximizing the return loss over the operating frequency bands.

Obviously many modifications and variations of the present invention are possible in the light of the above teachings. It is therefore to be understood that within the scope of the appended claims the invention may be practiced otherwise than as specifically described.

What is claimed is:

1. A transition from double ridge waveguide to suspended substrate comprising:

a suspended substrate circuit board having a substrate circuit formed thereon;

a metallic housing enclosing said suspended substrate circuit board, having a channel therein, said suspended substrate circuit board being positioned within said metallic housing such that said substrate circuit is suspended in air;

said metallic housing including at least one double ridge waveguide input/output port aligned with respect to said suspended substrate circuit board such that at least a portion of said substrate circuit lies within the region encompassed by said waveguide input/output port, said double ridge waveguide input/output port further comprising a waveguide positioned generally orthogonally to the plane of said suspended substrate circuit board and extending from the exterior of said metallic housing to an edge of said metallic housing channel, said waveguide having first and second broadwalls and first and second narrow walls, said double-ridge waveguide input/output port further comprising a first set of stepped ridges extending from said first broadwall and a second set of stepped ridges extending from said second broadwall, neither of said sets of stepped ridges contacting said suspended substrate circuit.

2. The transition of claim 1 wherein:

said suspended substrate circuit board is comprised of a layer of dielectric material having said substrate circuit formed thereon and wherein said substrate circuit comprises a metallized region on said dielectric material.

3. The transition of claim 1 wherein:

said substrate circuit includes a suspended substrate circuit probe extending within the region encompassed by said waveguide input/output port.

4. The transition of claim 1 wherein:

said suspended substrate circuit is a millimeter wave circuit.

5. The transition of claim 1 wherein:

said double-ridge waveguide is positioned on one side of the plane of said suspended substrate printed circuit board and wherein said transition further comprises:

a back short cavity formed within said metallic housing and merging with said waveguide and positioned on the other side of the plane of said suspended substrate printed circuit board.

6. The transition of claim 1 wherein said first set of stepped ridges comprise:

a single ridge extending from said first broadwall; and a plurality of ridge height adjustment screws extending from the exterior of said metallic housing, through said metallic housing, through said single ridge and into the region encompassed by said waveguide.

7. The transition of claim 6 wherein:

said single ridge extends into said back short cavity.

8. In a transition from waveguide to suspended substrate including a suspended substrate circuit board that is contained within a metallic housing and further including a waveguide formed within said metallic housing for propagating energy to or from said suspended substrate circuit board, the improvement wherein:

said waveguide is a double-ridge waveguide, said waveguide including first and second broadwalls and wherein said double-ridge waveguide comprises:

a first ridge transformation section extending from said first broadwall; and a second ridge transformation section extending from said second broadwall;

said first and second ridge transformation sections extending from said first broadwall in a variable height taper, and neither of said first and second ridge transformation sections contacting said suspended substrate circuit board.

9. In the transition of claim 8, the improvement wherein:

said first ridge transformation section has first and second ends, said first end being adjacent said double ridge waveguide and said second end being adjacent said suspended substrate circuit board, the height of said first ridge transformation section at said first end being above the height of said first broadwall and the of height of said first ridge transformation section at said second end being the same as the height of said first broadwall.

10. In the transition of claim 9, the improvement wherein:

said second ridge transformation section has first and second ends, said first end of said second transformation section being adjacent said double ridge waveguide and said second end of said second ridge transformation section being adjacent said suspended substrate circuit board, the height of said second transformation section at said first and second ends of said second ridge transformation section being above the height of said second broadwall.

* * * * *